Patented June 5, 1945

2,377,610

UNITED STATES PATENT OFFICE

2,377,610

STABILIZATION OF FATTY MATERIAL

Leo C. Brown, Chicago, Ill., assignor to Industrial Patents Corporation, Chicago, Ill., a corporation of Delaware No Drawing. Application February 11, 1942, Serial No. 430,366

6 Claims. (Cl. 260—398.5)

This invention is directed to the stabilization of organic materials and more particularly it relates to the stabilization of fatty materials, such as fatty acids, their esters and other derivatives, by the addition of a new composition. The invention is directed specifically to the improvement and stabilization of fats and oils by the use of gum guaiac and its derivatives in a novel preparation.

Gum guaiac and its derivatives are excellent stabilizers for fatty materials, particularly fats and oils such as lard, vegetable shortenings, margarine and like edible products. The use of gum guaiac for such purpose is covered in United States Patent No. 1,903,126. In the employment of gum guaiac or its derivatives as a stabilizer for fats and oils, difficulty is often encountered in the securing of the necessary dispersion of the agent in the fatty material because the solubility of these materials in many oleaginous compositions is relatively low. The dispersion or dilution of these agents in fats or oils has usually been obtained by vigorous agitation or milling, but this is a slow and expensive operation, and the desired efficiency of the gum guaiac or the like is apparently not fully realized.

The present invention is directed to the improvement whereby the gum guaiac and/or its derivatives are readily incorporated into the material to be stabilized. It has been found that gum guaiac or the acyloxy and/or alkoxy derivatives thereof may be readily and easily incorporated in the fats, oils or the like by forming a solution of these agents in an organic compound having a lipophilic group and at least one hydroxyl group, and incorporating the solution with the fatty material to be protected. The potency of the stabilizing agent is greatly increased when incorporated in this manner. For example, the stabilization of fats and oils against oxidative degradation, such as rancidification, polymerization and the like, is unexpectedly prolonged by the use of such solutions as compared with the direct incorporation of the agent into the fat or oil. It should be noted that the incorporation of gum guaiac into a fatty oil or similar oleaginous material to which the solvent has already been added does not effect the novel results of improved solubility and stabilization obtained according to the present process wherein the gum guaiac is dissolved in the solvent before incorporation into the material to be stabilized.

The concentration of gum guaiac in the solvent may vary within a wide range but it is preferred to use relatively concentrated or saturated solutions in order to control the proportion of solvent introduced into the fat. In practicing the invention, solutions containing from one per cent or a fraction of one per cent to about forty per cent of gum guaiac can be used but usually concentrations of twenty-five per cent to forty per cent are preferred.

The gum guaiac may contain foreign bodies which are insoluble in the hydroxy substituted lipophilic organic solvents. In such case, the dissolving of the gum in the solvent may also serve as a purification and concentration of the active constituents of the agent. Any undissolved or solid foreign materials remaining suspended in the solution may be removed by settling, filtering and/or centrifuging.

The solution of gum guaiac is readily incorporated with the material to be stabilized by intimately mixing the solution with the material, the gum guaiac being dispersed throughout the body of the mixture by the mutual solvent action of the hydroxy substituted lipophilic organic solvent. Sufficient of the solution is used to obtain the desired stabilization. Ordinarily about 0.001 per cent to 0.1 per cent and preferably about 0.01 per cent to 0.03 per cent by weight of gum guaiac based on the material to be stabilized are desirable proportions, although it is contemplated that still larger amounts may be employed.

The solvent is usually one which also improves the fatty material under treatment and hence can be left in the ultimate composition to yield a greatly improved product both as to stabilization and other physical properties. For example, the creaming properties of shortening and the ability of shortening to produce cakes of high sugar to flour ratio are materially improved by the use of a non-toxic solvent such as a fatty acid monoglyceride for incorporation of the gum guaiac. Likewise, the anti-spattering property of margarine and the anti-foaming properties of shortening can be improved by the use of such a material for incorporating the antioxidant agent therein. Although it is preferred to use a solvent which may be retained in the fatty material, thereby improving the properties of the product, it is not necessary that such a solvent be used. Some of the solvents contemplated for use according to the present invention are readily removed by vaporization after the incorporation of the gum guaiac in the fatty substance. The more volatile compounds may be distilled from the fat at low temperatures even at atmospheric pressure and without a current of steam, but others are removed by vacuum and/or steam at reasonably low temperatures.

A preferred method of removing certain of the solvents is to separate them during the deodorization of the fats. The fatty materials are often deodorized to remove the undesirable odors by conducting a current of steam through the fat at atmospheric but preferably sub-atmospheric pressure and at temperatures of about 160 degrees to 200 degrees C., preferably about 175 degrees C. When the deodorization is conducted on the product after the addition of the gum guaiac solution, the lower boiling solvents are removed in the deodorization step. The deodorization of the fatty material, after the incorporation of the gum guaiac solution, appears to stabilize the final product to an even greater degree.

If the oil or fat is to be treated otherwise than by deodorization, for example, by caustic refining or hydrogenating, it is preferred to add the gum guaiac after these processes have been completed. In the treatment of vegetable oils it is often desirable to at least partially hydrogenate the oil prior to the addition of the anti-oxidant.

Among the preferred class materials which may be improved by the present means are: olive oil, butter, lard, cottonseed oil, soy bean oil, peanut oil, tallow, sesame oil, coconut oil, palm oil, palm kernel oil, safflower oil, sun flower oil, linseed oil, chaulmoogra oil, menhaden oil, sardine oil, spermaceti, sperm oil, whale oil, fish liver oils, vitamin concentrates, beeswax, wool fat, castor oil, tall oil, almond oil, cocoa butter, cashew nut oil, cashew nut shell oil, chicken fat, kapok oil, corn oil, rape oil, oiticica oil, perilla oil, tung oil, the full and partial hydrogenated derivatives of these oils, the individual fatty acids therein and mixtures thereof, the monohydric alcohol esters of the acids therein, and the full and partial polyhydric alcohol esters therein, various other derivatives of these fatty acids, and mixtures of any of the foregoing acids, esters and other derivatives.

The following examples are now given for the purpose of illustrating the present invention but they are not intended to be limiting on the scope thereof.

*Example I*

About 8.5 parts by weight of gum guaiac are dissolved in ninety-three parts of monostearin at a temperature of about 100 degrees C. The solution is then filtered to remove about fifteen to twenty per cent of the gum guaiac as bark, woodchips and other extraneous materials. A quantity of refined prime steam lard is divided into seven portions to five of which is added a different amount of the above-prepared seven per cent solution of gum guaiac in monostearin. To a sixth sample, about 0.1 per cent of gum guaiac is added in the form of the powdered gum, and to the seventh sample nothing is added. All seven samples are submitted to the active oxygen (peroxide) keeping test and the following results obtained therefrom:

| Sample | Per cent concentrate | Per cent monoglyceride | Per cent gum guaiac | Active oxygen test hours |
|---|---|---|---|---|
| #1 | 0.36 | 0.335 | 0.025 | 14 |
| #2 | 0.72 | 0.67 | 0.050 | 26 |
| #3 | 1.08 | 1.005 | 0.075 | 39 |
| #4 | 1.44 | 1.34 | 0.100 | 46 |
| #5 | 2.88 | 2.68 | 0.200 | 91 |
| #6 | | | 0.100 | 13 |
| #7 | | | | 8 |

It can be readily seen from the above results that the use of the monostearin as a solvent greatly increases the activity of the gum guaiac in stabilizing the fatty material. The gum guaiac and the monostearin may be used in about one-fourth (0.025/0.100) the quantity ordinarily used by adding the gum guaiac directly to the material or from another point of view the same quantity (0.100%) of gum guaiac in solution produced about three and one-half (46/13) times the effect that the undissolved material yields.

It has further been found that the novel solvent employed with the gum guaiac for incorporation with the fatty material not only assists in getting the gum guaiac into the fatty substance but also affects the stabilizing properties of the substance. This added stability is effectively demonstrated by the following series of tests in which the amount of gum guaiac in lard is kept at a constant while the amount of monostearin is varied.

*Example II*

Solutions containing different concentrations of gum guaiac in monostearin are prepared according to the procedure outlined in Example I. These solutions are added to a quantity of refined and filtered prime steam lard and compared with an unmodified lard control sample in an active oxygen stability test. Results of these tests are as follows:

| Sample | Per cent concentrate | Per cent monoglycerides | Per cent gum guaiacum | Active oxygen test hours |
|---|---|---|---|---|
| #1 | | | | 6 |
| #2 | 0.15 | 0.10 | 0.05 | 10 |
| #3 | 0.25 | 0.20 | 0.05 | 12 |
| #4 | 0.35 | 0.30 | 0.05 | 16 |
| #5 | 0.55 | 0.50 | 0.05 | 20 |

Although the above examples are directed to the use of monostearin as the hydroxy substituted lipophilic compound, it is also possible to use other mono-hydroxy and/or poly-hydroxy lipophilic substances such as the esters of polyhydroxy compounds containing free unesterified hydroxyl groups. For example, one or more higher fatty acids, such as those normally found as constituents of animal, vegetable or marine fats, oils and waxes, examples of which are given hereinbefore, esterified with a part of the hydroxyl groups of one or more of the following poly-hydroxy substances are particularly effective: polyhydric alcohols including glycerol, trimethylene glycol, ethylene glycol, propylene glycol, diethylene glycol, polymerized glycerol, polymerized glycols, mannitol, sorbitol, pentaerythritol; sugars including glucose, mannose, xylose, arabinose, sucrose, galactose; glycosides such as compounds resulting when aldehyde sugar groups are blocked by alkylation to form acetals; polyhydroxy amines and amides such as diethanolamine, diethanolamide of acetic acid, triethanolamine, aminotrimethylolmethane; and polyhydroxy esters such as esters of tartaric acid, esters of glyconic acid, esters of mannonic acid, esters of galactonic acid and esters of xylonic acid.

Higher fatty alcohols which may be similarly employed include lauryl alcohol, decyl alcohol, octyl alcohol, hexyl alcohol, undecyl alcohol, myristyl alcohol, cetyl alcohol, stearyl alcohol, melissyl alcohol, carnaubyl alcohol, oxidized petroleum and the like. The partial ethers of these alcohols with the above listed aliphatic polyhydroxy compounds may be similarly used. Esters of the above mentioned monohydric and polyhydric alcohols with hydroxy substituted acids such as citric acid, lactic acid, glycolic acid, malic acid, tartaric acid and ricinoleic acid are also suitable. Examples of such materials are ricinoleic acid diglyceride, ricinoleic acid triglyceride and hexyl citrate. Hydroxy substituted amides of aliphatic acids may also be employed, such as ricinolamide, N-β-hydroxy ethyl stearamide, di (N-β-hydroxy ethyl) lauramide, lauric acid amide of monoglycerolamine, N-dodecyl glycolamide and N-cetyl glyceramide. Compounds containing free acid groups in addition to hydroxy groups, such as ricinoleic acid, dihydroxy stearic acid, sativic acid, hydroxy naphthenic acid, hydroxy aliphatic acids from oxidized petroleum and the like, are satisfactory but it is usually desirable to remove these materials after incorporation of the gum guaiac. This may be accomplished by the deodorization or other processes.

Although lipophilic acylic compounds with alcohol hydroxyl groups are preferred, it is also possible to employ compounds containing aryl, alkaryl, cycloalkyl and/or heterocyclic groups with alcohol and/or phenolic hydroxyl groups; for example, dodecyl phenol, hydroxyl lauryl benzine, decyl resorcinol, phenyl hydroxy stearic acid, alkylated furfuryl alcohol and alkylated tetrahydrofurfuryl alcohol. In any case, it is usually desirable to have at least five carbon atoms in the lipophilic functional group.

Any of the aforementioned individual compounds may be employed alone or in various mixtures thereof. The preferred compounds, namely, the higher fatty acid partial glycerides and other higher fatty acid derivatives, may be prepared from the pure fatty acids or from normally occurring mixtures thereof, such as fatty oils, waxes, oxidized petroleum, fats or the like, with or without the materials normally associated therewith such as sterols, vitamins, glycerol, phosphatides, antioxidants, etc.

As pointed out hereinbefore, many of these substances not only improve the effectiveness of the gum guaiac or its derivatives but they also yield products of improved properties, for example, they assist in the creaming of shortening preparations, in the spattering-resistance of margarine, and the preparation of baked goods having a high ratio of sugar to flour from these treated shortenings. Many of the solvents such as the partial glycerides of soy bean oil, sesame oil and palm oil, improve the resistance to rancidity and other degradation to an even greater extent.

Although this invention is particularly directed to the improvement of fatty materials, it is also possible to similarly improve other organic substances such as soap, petroleum, lubricating oils, cracked and natural gasoline, fuel oils, gas oils, terpenes, carotenes, and other hydrocarbons; soaps, essential oils, flavors, perfumes; synthetic polyamides, glue, zein, gelatin and casein; rosin, shellac, copal, polyvinyls, polyacrylates and other natural and synthetic resins; rubber, polychloroprene, thiokol, polybutadiene, polyisoprene, chicle, and other natural and synthetic rubbers; and/or the like with or without any of the aforementioned fatty materials. The improved products may be in the form of cosmetics, such as creams; food stuffs, such as butter, lard, hydrogenated vegetable shortenings, margarine, mayonnaise, peanut and like nut butter, baked goods, cereals, meals, flours, soup and soup stocks; lacquers, paints, inks and plastics; medicines and vitamin concentrates.

The solution of gum guaiac and its acyl or alkyl derivatives may be used alone or in mixtures or along with other antioxidants and modifying agents such as citric acid, malic acid, phosphoric acid, salicylic acid, benzoic acid, pyrogallol-acetone condensation product, hexyl resorcinol, aminophenol mono- and dihydroxy naphthalene, and the like. Glycerol, polyglycerol, ethylene glycol, polyglycols, propylene glycols, tetrahydrofurfuryl alcohol, lactic acid and the like can also be employed as solvents for assisting in the incorporation of gum guaiac into the organic material to be stabilized. The use of the ultimate composition determining the type of agent which may be so incorporated.

Obviously, many modifications and variations of the invention hereinbefore set forth may be made without distinguishing from the spirit and scope thereof, and therefore only such limitations should be imposed as are indicated in the appended claims.

I claim:

1. The process of stabilizing fats and oils against rancidity which comprises embodying therein a solution of gum guaiac in a higher fatty acid partial glyceride, the latter solvent being added to the stabilized fat in an amount not sufficient to substantially alter the shortening properties of the stabilized fat.

2. The process of stabilizing fats and oils against oxidative deterioration which comprises incorporating in said fatty material a minor proportion of a solution of gum guaiac in a higher fatty acid partial ester of glycerine, said gum guaiac being present in sufficient amount to substantially retard said deterioration.

3. The process according to claim 2 in which the partial ester is a monoglyceride.

4. The process according to claim 2 in which the amount of gum guaiac is about 0.01 per cent to 0.03 per cent based on the fatty material.

5. The process according to claim 2 in which the solution contains about 5 per cent to 10 cent of gum guaiac.

6. The process according to claim 2 in which the partial ester is monostearin.

LEO C. BROWN.